US011685132B2

(12) United States Patent
Rouby et al.

(10) Patent No.: US 11,685,132 B2
(45) Date of Patent: Jun. 27, 2023

(54) METHOD FOR MANUFACTURING A TIRE WITH OBLIQUELY REINFORCED TREAD BLOCKS

(71) Applicant: COMPAGNIE GENERALE DES ETABLISSEMENTS MICHELIN, Clermont-Ferrand (FR)

(72) Inventors: Mickael Rouby, Clermont-Ferrand (FR); Patrice Monnereau, Clermont-Ferrand (FR); Christophe Bessac, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 207 days.

(21) Appl. No.: 17/058,914

(22) PCT Filed: May 17, 2019

(86) PCT No.: PCT/EP2019/062881
§ 371 (c)(1),
(2) Date: Nov. 25, 2020

(87) PCT Pub. No.: WO2019/228830
PCT Pub. Date: Dec. 5, 2019

(65) Prior Publication Data
US 2021/0213696 A1 Jul. 15, 2021

(30) Foreign Application Priority Data
May 29, 2018 (FR) ........................................ 1854595

(51) Int. Cl.
*B29D 30/66* (2006.01)
*B60C 11/13* (2006.01)

(52) U.S. Cl.
CPC .......... *B29D 30/66* (2013.01); *B60C 11/1346* (2013.01); *B29D 2030/662* (2013.01); *B29D 2030/665* (2013.01)

(58) Field of Classification Search
CPC ......................... B29D 30/66; B29D 2030/665
See application file for complete search history.

(56) References Cited

U.S. PATENT DOCUMENTS 1,948,311 A * 2/1934 Orr ..................... B60C 11/0311
152/212
2,207,098 A * 7/1940 Maynard ................ B29D 30/52
156/114

(Continued)

FOREIGN PATENT DOCUMENTS

AU 2467971 7/1972
DE 1289306 B 2/1969

(Continued)

OTHER PUBLICATIONS

Machine translation for German 102006028616 (Year: 2022).*
International Search Report dated Jul. 22, 2019, in corresponding PCT/EP2019/062881 (6 pages).

*Primary Examiner* — Steven D Maki
(74) *Attorney, Agent, or Firm* — Venable LLP

(57) ABSTRACT

A method for manufacturing a tread (5) based on uncured rubber material comprises the steps of forming a green form (9) of tread based on uncured rubber material having at least one tread pattern (2) block (3), each tread pattern (2) block (3) having a central portion (11) and at least one lateral portion (12) extending along the central portion (11), of mounting at least one reinforcing ply (7) on at least a part of the central portion (11), and of covering the central part (11) with the aid of the lateral portion (12) in order that the tread pattern (2) block (3) envelops the reinforcing ply (7).

8 Claims, 3 Drawing Sheets

(56) References Cited

U.S. PATENT DOCUMENTS

| | | | | |
|---|---|---|---|---|
| 2,232,487 | A | * | 2/1941 | Smith .................... B29D 30/52 156/519 |
| 2,710,042 | A | | 6/1955 | Gates, Jr. |
| 3,565,716 | A | | 2/1971 | Felker |
| 5,298,216 | A | | 3/1994 | Kim et al. |
| 10,744,733 | B2 | | 8/2020 | Sandstrom et al. |
| 10,850,464 | B1 | | 12/2020 | Sandstrom et al. |
| 2013/0048171 | A1 | | 2/2013 | Sandstrom et al. |
| 2014/0138874 | A1 | * | 5/2014 | Mayni .................... B60C 11/11 425/34.1 |
| 2015/0007926 | A1 | | 1/2015 | Sandstrom et al. |
| 2016/0318346 | A1 | | 11/2016 | Clemmer et al. |
| 2020/0368984 | A1 | | 11/2020 | Sandstrom et al. |
| 2021/0197511 | A1 | | 7/2021 | Rouby et al. |

FOREIGN PATENT DOCUMENTS

| | | | |
|---|---|---|---|
| DE | 19542996 | A1 | 5/1997 |
| DE | 102006028616 | A1 * | 12/2007 |
| DE | 102012214485 | A1 | 2/2013 |
| EP | 1870259 | A1 | 12/2007 |
| JP | 2011-37415 | A | 2/2011 |
| JP | 2013-237283 | A | 11/2013 |
| WO | 2015/108744 | A1 | 7/2015 |
| WO | 2016/184692 | A1 | 11/2016 |

* cited by examiner

METHOD FOR MANUFACTURING A TIRE WITH OBLIQUELY REINFORCED TREAD BLOCKS

TECHNICAL FIELD OF THE INVENTION

The present invention relates to a method for manufacturing a tyre having reinforced tread pattern blocks making it possible to limit the rocking of the tread pattern blocks.

TECHNICAL BACKGROUND OF THE INVENTION

The incorporation of a reinforcer during the production of a tread in a centralized manufacturing process is not economically conceivable, since, during the assembly of these composite semifinished products, scrap that is produced is not recyclable, meaning that it results in losses of material that cannot be reused.

SUMMARY OF THE INVENTION

The aim of the invention is to propose a method for manufacturing a recyclable tread that makes it possible to obtain a tyre having reinforced tread pattern blocks.

To this end, the invention relates to a method for manufacturing a tread based on uncured rubber material, characterized in that it has the following steps of:
  Forming a green form of tread based on uncured rubber material having at least one tread pattern block, each tread pattern block having a central portion and at least one lateral portion extending along the central portion;
  Mounting at least one reinforcing ply on at least a part of the central portion;
  Covering the central portion with the aid of the lateral portion in order that the tread pattern block envelops the reinforcing ply.

Advantageously according to the invention, the method makes it possible to form a tread made of uncured rubber material, the scrap of which can be recycled. The method can also be implemented separately or directly on a green form, for example on a carcass, of tyre. The tread can thus be reinforced and mounted on the green form of the tyre before the whole is crosslinked.

Advantageously according to the invention, each tread pattern block is created from several portions made of uncured rubber material that may or may not be in one piece. The geometry of the central portion makes it advantageously possible to choose the angle that the reinforcing ply makes with respect to the contact surface of the tread. The orientation of the reinforcing ply against the central portion is maintained by covering the lateral portion. The latter therefore forms the part of the tyre that is intended to be in contact with the ground. It will also be understood that the reinforcing play can thus be of very different kinds.

The invention may also have one or more of the following optional features, on their own or in combination.

Each central portion and the associated lateral portion(s) thereof are connected by a base, thereby making it possible to ensure a geometry between the portions.

The central portion may have has a prismatic shape with a polygonal base, at least one face of which is intended to receive the reinforcing ply, thereby making it advantageously possible to choose an angle, between the reinforcing ply and the contact surface of the tread, that is substantially constant.

The central portion has a prismatic shape with a triangular base, two adjacent faces of which are intended to receive the reinforcing ply, thereby making it possible to position a reinforcing ply for example in a manner entirely covering the upper surface of the central portion. It will be understood that it is thus possible to obtain a reinforcing ply profiled element with a chevron-shaped cross section, the apex of which is oriented towards the contact surface of the tread.

Each lateral portion has a prismatic shape with a polygonal base, at least one face of which is used to cover a part of the central portion, making it possible to coincide with at least one face of the central portion. The prismatic shape also makes it possible to form the external shape of the tread pattern blocks of the green form of the tread.

Advantageously according to the invention, the green form of tread may have a plurality of tread pattern blocks. It may also be in one piece, thereby making it possible to ensure its geometry and to easily mount it on the green form of the tyre.

The step of forming the green form of tread may be carried out by extrusion in order to provide a profiled element with the desired cross section for all or part of the green form of the tread with the necessary length for the tyre to be manufactured.

The method may also have a final rolling step for improving the adhesion of the lateral portion(s) to its (their) associated central portion.

Moreover, the invention relates to a method for manufacturing a tyre, characterized in that it has a step of manufacturing the tread that is carried out using the manufacturing method as set out above.

The method for manufacturing the tyre therefore makes it possible to produce a green form of tread with at least one reinforced tread pattern block that can be integrated with conventional tyre manufacturing steps, that is to say without any particular adaptation.

BRIEF DESCRIPTION OF THE DRAWINGS

Further particular features and advantages will become clearly apparent from the following description thereof, which is given by way of entirely non-limiting example, with reference to the appended drawings, in which.

DETAILED DESCRIPTION OF AT LEAST ONE EMBODIMENT OF THE INVENTION

In the various figures, the elements that are identical or similar bear the same references, possibly supplemented by a suffix. The description of their structure and of their function is therefore not systematically repeated.

Figure 1:
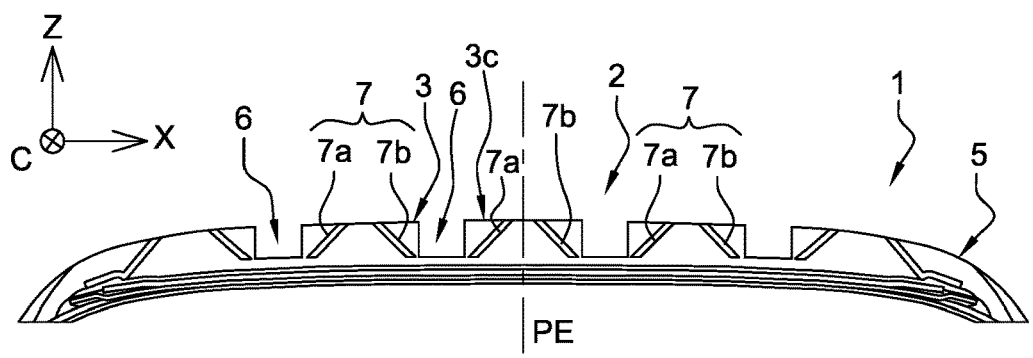
FIG. 1 is a view in partial section of a tyre obtained according to a first embodiment of the method according to the invention.
Figure 6:
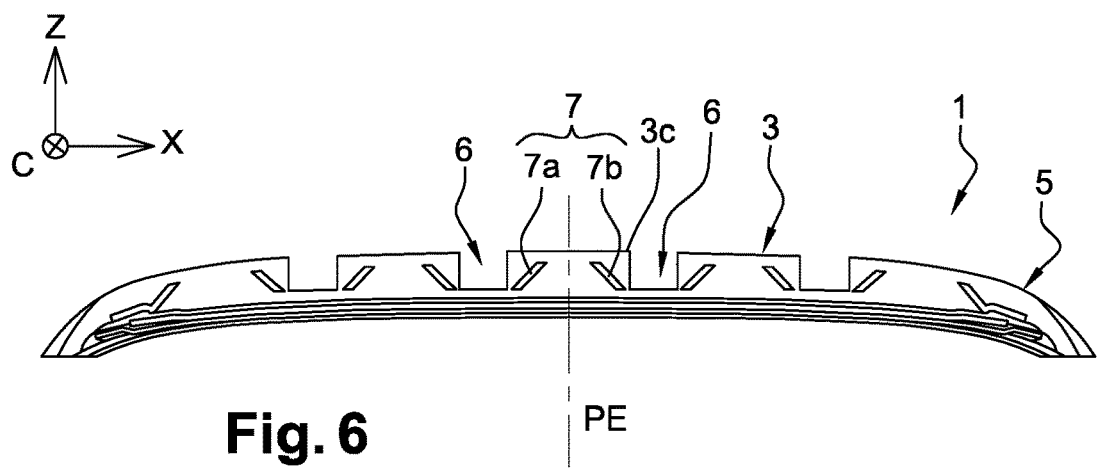
FIG. 6 is a view in partial section of a tyre obtained according to the variant of the first embodiment of the method according to the invention.
Figure 8:
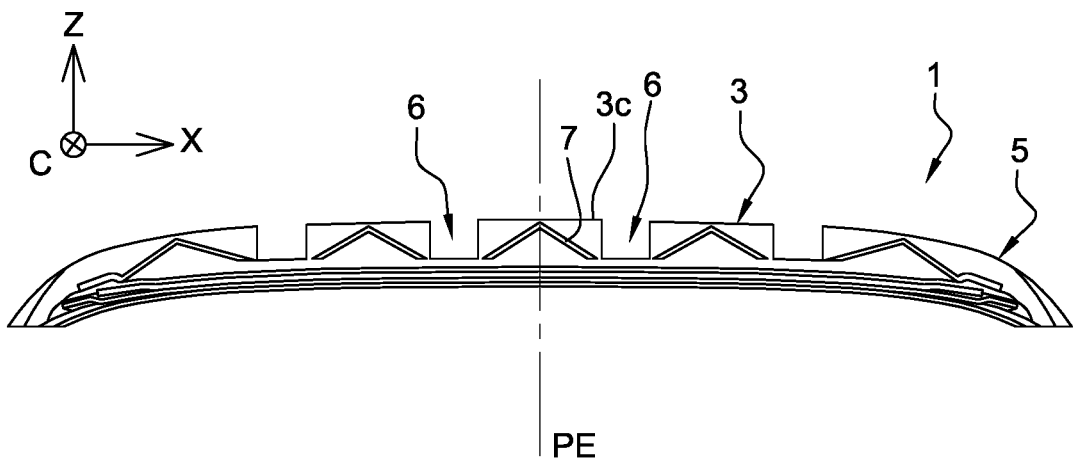
FIG. 8 is a view in partial section of a tyre obtained according to the second embodiment of the method according to the invention.

In FIGS. 1, 6 and 8, mutually orthogonal axes C, X and Z, which correspond to the normal circumferential (C), axial (X) and radial (Z) orientations of a tyre 1, are shown. A "tyre" means all types of resilient tread subjected to an internal pressure.

A "rubber material", or "rubber", means a material based on a crosslinkable composition comprising an elastomer, for example a diene elastomer. Such a material is referred to as "uncured rubber material" or "uncured rubber" before crosslinking.

The term "carcass" means any part that does not belong to the tread.

A "tread" means a quantity of rubber material delimited by lateral surfaces and by two main surfaces, one of which, referred to as the tread surface, is intended to come into contact with a road surface when the tyre is being driven on.

The aim of the invention is to propose a method for manufacturing a recyclable tread that makes it possible to obtain a tyre having reinforced tread pattern blocks.

The invention is applicable to any type of tyre, in particular those intended to be fitted on motor vehicles of the passenger or SUV ("Sport Utility Vehicle") type, two-wheel vehicles (in particular motorcycles), aircraft, industrial vehicles selected from vans, heavy transport vehicles, i.e. light rail vehicles, buses, heavy road transport vehicles (lorries, tractors and trailers), and off-road vehicles such as agricultural or construction plant vehicles, or other transport or handling vehicles. The invention is also applicable to non-motorized vehicles, in particular a trailer, a semi-trailer or a caravan.

The manufacturing method according to the invention makes it possible to obtain a tyre 1, in which the tread pattern 2 blocks 3 of the tread 5 (parts between the circumferential grooves 6 of the tyre 1) are stiffened, as illustrated in FIG. 1. The stiffening is obtained by reinforcing plies 7 that are present in the tread pattern 2 blocks 3 and oriented obliquely with respect to the tread surface so as to limit their deformation in order to improve the behaviour and wearing of the tyre 1.

More specifically, in the example illustrated in FIG. 1, it is possible to see that, in the partial meridian section of the tread 5 (section plane oriented on the axes X-Z) obtained according to a first embodiment of the invention, the reinforcing plies 7 form profiled elements with a cross section in the form of truncated chevrons in each tread pattern 2 block 3. An equatorial plane PE (oriented on the axes C-Z), illustrated in FIG. 1, is perpendicular to the axis of rotation of the tyre and to the section plane in FIG. 1, and situated at the midway point of the tread 5 along the axis X.

Thus, for the block 3c through which the plane PE passes, the first 7a and second 7b reinforcing plies are symmetric with respect to the equatorial plane PE, start substantially from the bottom of the adjacent groove 6 (a thickness of rubber material is visible in FIG. 1 between the bottom of each groove 6 and each of the reinforcing plies 7a, 7b) and extend obliquely in the tread pattern 2 block 3c towards the equatorial plane PE as far as the upper surface of the block 3c, without intersecting the equatorial plane PE. It will be understood that this configuration, advantageously according to the invention, makes it possible to limit the rocking of the tread pattern 2 blocks 3 when the tyre 1 is loaded.

This tyre 1 is obtained by virtue of a first embodiment of the method according to the invention. More specifically, the invention relates to a method for manufacturing a tread 5 based on uncured rubber material and to a method for manufacturing a tyre 1 using the method for manufacturing a tread 5.

According to the first embodiment, the method for manufacturing the tread 5 has a first step intended for forming a green form 9 of tread 5 based on uncured rubber material. The green form 9 has at least one separated tread pattern 2 block 3, that is to say one that is divided into a plurality of portions 11, 12. Preferably, each tread pattern 2 block 3 has a central portion 11 and first 12a and second 12b lateral portions. In the example illustrated in FIG. 2, it is possible to see that the first 12a and second 12b lateral portions extend, preferably, respectively on either side of the central portion 11.

It will therefore be understood, in the first embodiment, that there is as much lateral portion as there is reinforcing ply to be embedded in the associated tread pattern 2 block 3. By way of entirely non-limiting example, if, in a variant, a single reinforcing ply 7 oriented obliquely were desired in at least one tread pattern 2 block 3, this would entail a step of forming a green form 9 of tread 5 with a central portion 11 and a single lateral portion 12.

Figure 2:
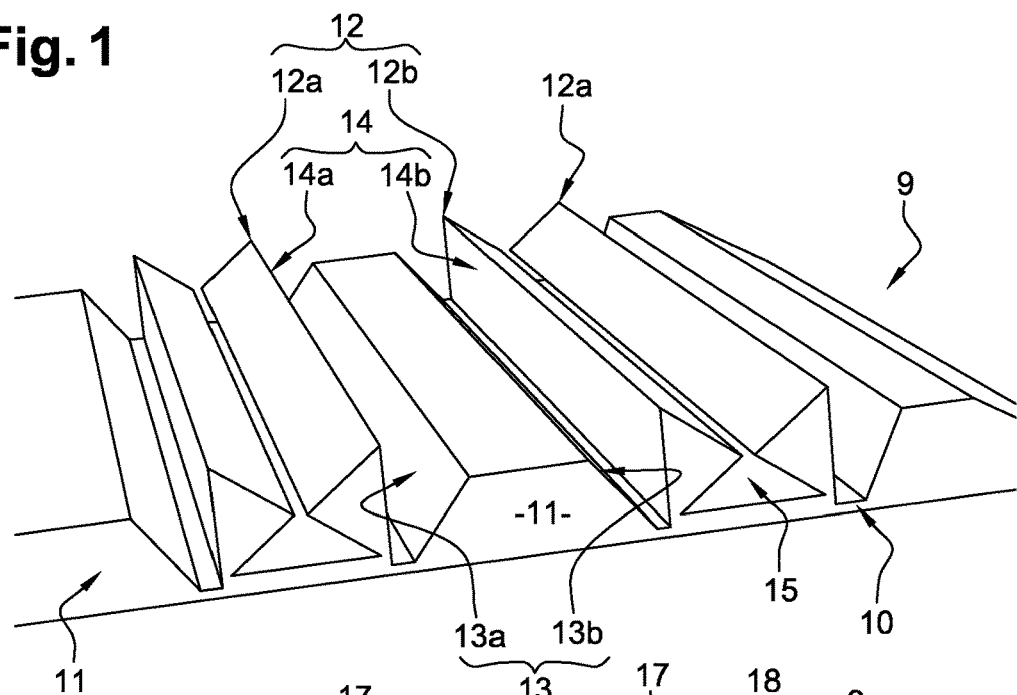
FIG. 2 is a partial perspective view of a green form of tread according to the first embodiment of the method according to the invention.

FIG. 2 is only a partial depiction of the green form 9. The profile visible in its first plane extends along a length greater than shown in FIG. 2 in order to allow the formation of the tread 5 around the entire circumference of the tyre 1.

For each tread pattern 2 block 3, the profile can thus have a central portion 11 having a prismatic shape with a polygonal base. In the example in FIG. 2, the base has a trapezoidal shape, the two non-parallel faces 13a, 13b of which are each intended to receive a reinforcing ply 7a, 7b. It will therefore be understood that the geometry of each receiving face 13, 13a, 13b makes it possible to choose the orientation and the curve that its associated reinforcing ply 7, 7a, 7b will have in the thickness of the tread pattern 2 block 3.

Thus, rather than having rectilinear sections, as illustrated in FIG. 1, each reinforcing ply 7, 7a, 7b could, in a variant, be, for example, concave or convex by consequently adapting each receiving face 13, 13a, 13b of the central portion 11.

By way of entirely non-limiting example, each central portion 11 and each associated lateral portion 12 can be connected by a common base 10, thereby making it possible to ensure the geometry between the portions 11, 12 and, more generally, of the green form 9 of the tread 5.

Preferably, each lateral portion 12, 12a, 12b has a prismatic shape with a polygonal base. In addition, at least one face 14, 14a, 14b of the polygon is used to cover at least a part of the central portion 11 making it possible to coincide with at least the region of the central portion 11 that will be covered by the reinforcing ply 7, 7a, 7b. The prismatic shape also makes it possible to form the external geometry of the tread pattern 2 blocks 3 of the green form 9 of the tread 5. Specifically, the faces that do not cover the central portion 11 are intended to form all or part of the outer envelope of the tread pattern 2 blocks 3.

In the particular example of FIG. 2, it is possible to see that two lateral portions 12, 12a, 12b of two different tread pattern 2 blocks 3 face one another. More specifically, the triangular bases of each prism of the lateral portions 12a, 12b face one another, forming a void 15 with a substantially triangular profile, one of the crowns of the void 15 being formed by the apices of the triangular bases of the facing lateral portions 12a, 12b. In FIG. 2, these apices do not touch one another, but, it being a matter of industrial manufacture, it is possible, as the case may be, for some apices to be able to touch one another.

As illustrated in FIG. 2, the green form 9 of tread 5 can therefore have a plurality of divided tread pattern 2 blocks 3, this not making it impossible for the green form 9 to be in one piece in order to ensure its geometry and to easily mount it on the green form of a tyre 1.

Specifically, the step of forming the green form 9 of tread 5 can be carried out for example by extrusion. It is thus possible to manufacture a profiled element having the desired cross section for all or part of the green form 9 of the tread 5 with the necessary length for the tyre 1 to be manufactured.

Figure 3:
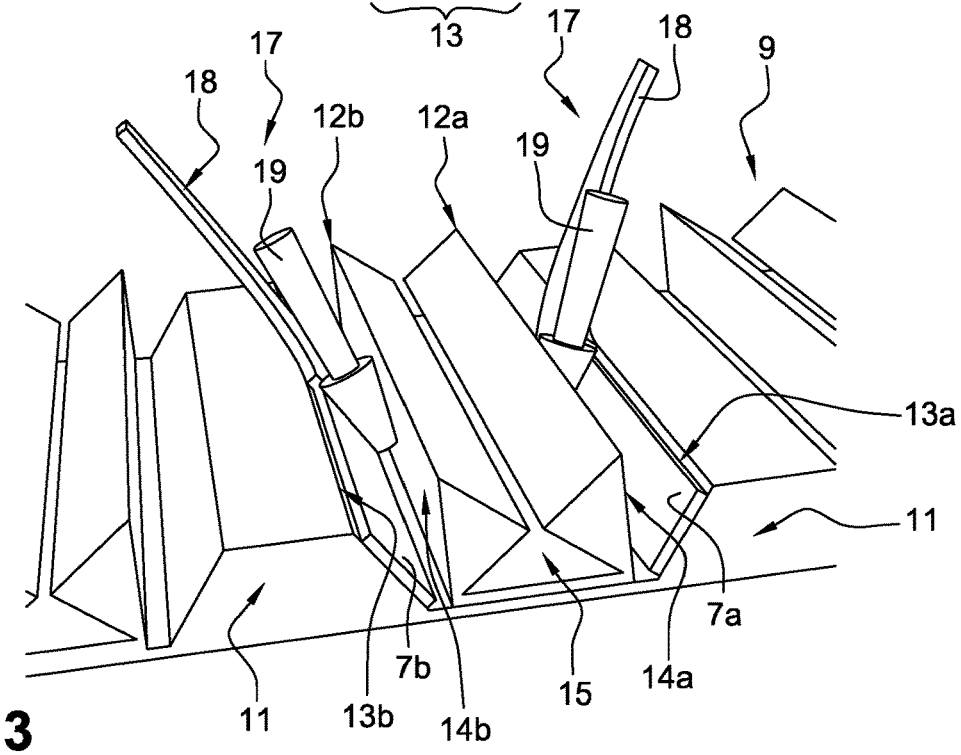
FIG. 3 is a partial perspective view of a step of mounting reinforcing plies on the green form of tread according to the first embodiment of the method according to the invention.
Figure 4:
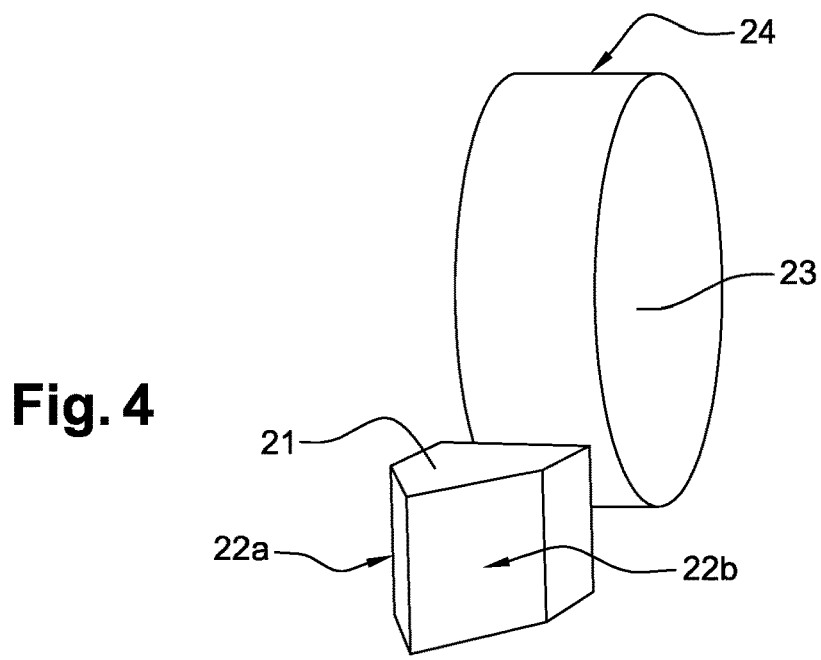
FIG. 4 is a perspective view of a displacement cam and of a roller for rolling the lateral portion for implementing the method according to the invention.

The method according to the first embodiment of the invention has a second step intended for mounting at least one reinforcing ply 7, 7a, 7b on at least a part 13, 13a, 13b of the central portion 11. An example of such a step is illustrated in FIG. 3. It is possible to see that the reinforcing plies 7, 7a, 7b are laid continuously on the receiving faces 13a, 13b of the central portions 11 with the aid of supply devices 17. Each supply device 17 may, for example, have a laying head 18 fed by a reinforcing-ply 7, 7a, 7b reel and at least one pressing roller 19. Each reinforcing ply 7, 7a, 7b is thus brought continuously against the receiving face 13, 13a, 13b chosen by the laying head 18 and is pressed against said face with the aid of the pressing roller 19 by rolling between the receiving face 13, 13a, 13b and the covering face 14a, 14b of the lateral portion 12, 12a, 12b.

The method according to the first embodiment of the invention then has a third step intended for covering the central part 11 with the aid of the first and second lateral portions 12, 12a, 12b. This third step makes it possible to form the tread 5 with at least one tread pattern 2 block 3 that envelops a reinforcing ply 7, 7a, 7b. Specifically, each lateral portion 12, 12a, 12b turned down on its central portion 11 makes it possible to form a tread pattern 2 block 3 bordered by a groove 6 on either side of its length, the bottom of which is formed from the void 15 before the covering step.

In the particular example in FIGS. 2 and 3, this step can be carried out for example with the aid of a displacement cam 21. More specifically, the displacement cam 21 has faces 22a, 22b that are intended to space apart the facing lateral portions 12a, 12b by sliding along the bottom of the void 15. After the displacement cam 21 has passed through the void 15, it will be understood that the latter has been enlarged and opened in order to more or less form the geometry of the grooves 6 illustrated in FIG. 1.

The method may also have a final rolling step. This final step could thus make it possible to improve the adhesion of the lateral portions 12, 12a, 12b to their associated central portion 11 and, incidentally, of the reinforcing ply 7, 7a, 7b against these lateral portions.

In the particular example in FIGS. 2 and 3, this step can be carried out for example with the aid of a rolling roller 23. More specifically, the rolling roller 23 has at least one face 24 intended to bear on each tread pattern 2 block 3 in order to cause the elements 7, 10, 11, 12, 12a, 12b of the tread pattern 2 block 3 to adhere to one another. After the rolling roller 23 has passed against each tread pattern 2 block 3, it will be understood that the upper surface of the latter is flattened so as to more or less form the geometry of the substantially flat tread surface of the tyre 1 illustrated in FIG. 1.

Advantageously according to the invention, the method therefore makes it possible to form a tread 5 made of uncured rubber material, the scrap of which can be recycled. The method can also be implemented separately or directly on a green form, for example on a carcass (not shown), of tyre 1. The tread 5 can thus be reinforced and mounted on the green form of the tyre 1 before the whole is crosslinked.

Advantageously according to the invention, each tread pattern 2 block 3 is created from several portions made of uncured rubber material that may or may not be in one piece. The geometry of the central portion 11 makes it advantageously possible to choose the angle that the reinforcing ply 7, 7a, 7b makes with respect to the contact surface of the tread 5. The orientation of the reinforcing ply 7, 7a, 7b against the central portion 11 is maintained by covering the first and second lateral portions 12, 12a, 12b. The latter therefore form the part of the tyre 1 that is intended to be in contact with the ground. It will also be understood that the reinforcing ply 7, 7a, 7b can thus, advantageously according to the invention, be of very different kinds, for example based on fibres based on polymers or on metal-based thread.

The invention also relates to a method for manufacturing a tyre 1 using the method for manufacturing a tread 5 based on uncured rubber material according to the first embodiment as set out above.

By way of entirely non-limiting example, the method for manufacturing a tyre could have the following steps of:
Manufacturing a carcass based on uncured rubber material;
Mounting on the carcass a tread based on uncured rubber material with the aid of the manufacturing method according to the first embodiment as set out above;
Crosslinking the tyre based on uncured rubber material while hot moulding the latter.

The method for manufacturing the tyre 1 therefore makes it possible to produce a green form 9 of tread 5 with at least one reinforced tread pattern 2 block 3 that can be integrated with conventional tyre 1 manufacturing steps, that is to say without any particular adaptation.

Figure 5:
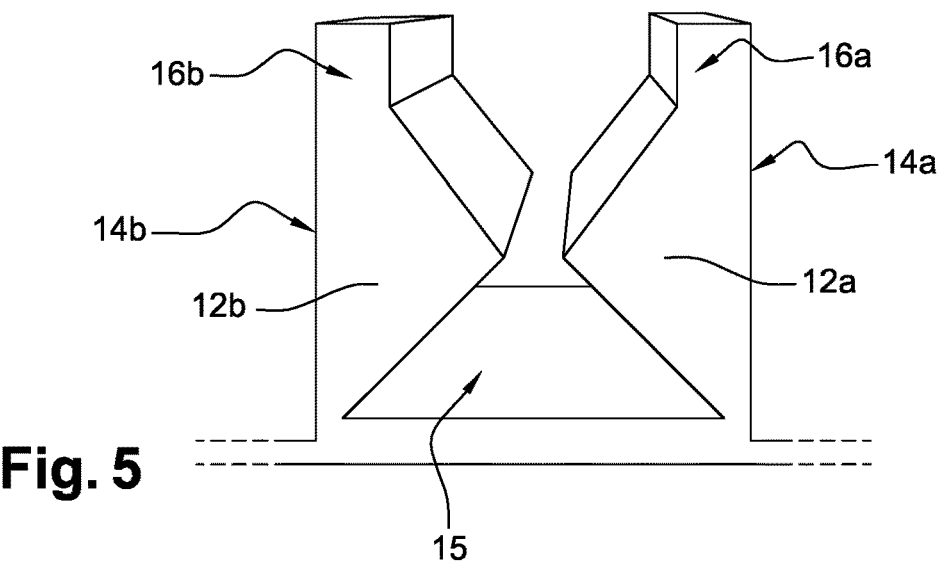
FIG. 5 is a partial perspective view of a green form of tread according to a variant of the first embodiment of the method according to the invention.

According to a variant of the first embodiment, the step of forming the green form 9 is adapted so as to modify the geometry of the green form 9 of tread 5. Thus, each tread pattern 2 block 3 has a central portion 11 similar to the one explained above. By contrast, as can be seen in FIG. 5, each lateral portion 12, 12a, 12b has at least one face 14, 14a, 14b of the polygon that is, preferably, continued by extensions 16a, 16b that may be in one piece.

According to the variant of the first embodiment, the method for manufacturing the tread 5 then has second and third steps and, optionally the final step, with the same effects and advantages as the first embodiment.

The manufacturing method according to the variant of the first embodiment of the invention makes it possible to obtain a tyre 1, in which the tread pattern 2 blocks 3 of the tread 5 (parts between the circumferential grooves 6 of the tyre 1) are stiffened, as illustrated in FIG. 6. The stiffening is obtained by reinforcing plies 7 that are present in the tread pattern 2 blocks 3 and oriented obliquely with respect to the tread surface so as to limit their deformation in order to improve the behaviour and wearing of the tyre 1.

More specifically, in the example illustrated in FIG. 6, it is possible to see that, in the partial meridian section of the tread 5 (section plane oriented on the axes X-Z) obtained according to the variant of the first embodiment of the invention, the reinforcing plies 7 form profiled elements with a cross section in the form of truncated chevrons in each tread pattern 2 block 3.

Thus, for the block 3c through which the plane PE passes, the first 7a and second 7b reinforcing plies are symmetric with respect to the equatorial plane PE, start substantially from the bottom of the adjacent groove 6 (a thickness of rubber material is visible in FIG. 6 between the bottom of each groove 6 and each of the reinforcing plies 7a, 7b) and extend obliquely in the tread pattern 2 block 3c towards the equatorial plane PE without reaching the upper surface of the block 3c or intersecting the equatorial plane PE.

It will be understood that this configuration, advantageously according to the invention, makes it possible to limit the rocking of the tread pattern 2 blocks 3 when the tyre 1 is loaded, while having a wearing thickness exhibiting only rubber material, that is to say in particular without a reinforcing ply 7, 7a, 7b. It is therefore inferred that the extensions 16a, 16b make it possible to add a thickness of rubber material above the reinforcing plies 7, 7a, 7b.

According to a second embodiment, the method for manufacturing the tread 5 has a first step intended for forming a green form 9 of tread 5 based on uncured rubber material, with the same effects and advantages as the first embodiment. However, the geometry of the green form 9 of tread 5 differs in order to obtain a different type of tread pattern 2 block 3.

The green form 9 has at least one separated tread pattern 2 block 3, that is to say one that is divided into a plurality of portions 11, 12. Preferably, each tread pattern 2 block 3 has a central portion 11 and first 12a and second 12b lateral portions. In the example illustrated in FIG. 7, it is possible to see that the first 12a and second 12b lateral portions extend, preferably, respectively on either side of the central portion 11.

For each tread pattern 2 block 3, the profile can thus have a central portion 11 having a prismatic shape with a polygonal base. In the example in FIG. 7, the prismatic shape has a triangular base. In addition, the two adjacent upper faces 13a, 13b are intended to receive a single reinforcing ply 7. It will therefore be understood that, in the second embodiment, a single reinforcing ply 7 can partially or entirely cover the upper surface of the central portion 11. It will be understood that it is thus possible to obtain a reinforcing ply 7 profiled element with a chevron-shaped cross section, the apex of which is oriented towards the contact surface of the tread 5.

It will therefore be understood that the geometry of each receiving face 13a, 13b makes it possible to choose the orientation and the curve that the reinforcing ply 7 will have in the thickness of the tread pattern 2 block 3.

Thus, rather than having rectilinear sections, as illustrated in FIG. 8, each reinforcing ply 7 could, in a variant, be, for example, concave or convex by consequently adapting each receiving face 13, 13a, 13b of the central portion 11. It is thus conceivable (not shown) for the cross section of the reinforcing ply 7 to extend in the form of an arch.

By way of entirely non-limiting example, each central portion 11 and each associated lateral portion 12 can be connected by a common base 10, thereby making it possible to ensure the geometry between the portions 11, 12 and, more generally, of the green form 9 of tread 5.

Preferably, each lateral portion 12, 12a, 12b has a prismatic shape with a polygonal base. In addition, at least one face 14, 14a, 14b of the polygon is used to cover at least a part of the central portion 11 making it possible to coincide with at least the region of the central portion 11 that will be covered by the reinforcing ply 7. Moreover, as can be seen in FIG. 7, each face 14, 14a, 14b of the polygon is continued by extensions 16a, 16b that may be in one piece.

The prismatic shape also makes it possible to form the external geometry of the tread pattern 2 blocks 3 of the green form 9 of the tread 5. Specifically, the faces that do not cover the central portion 11 are intended to form all or part of the outer envelope of the tread pattern 2 blocks 3.

Figure 7:
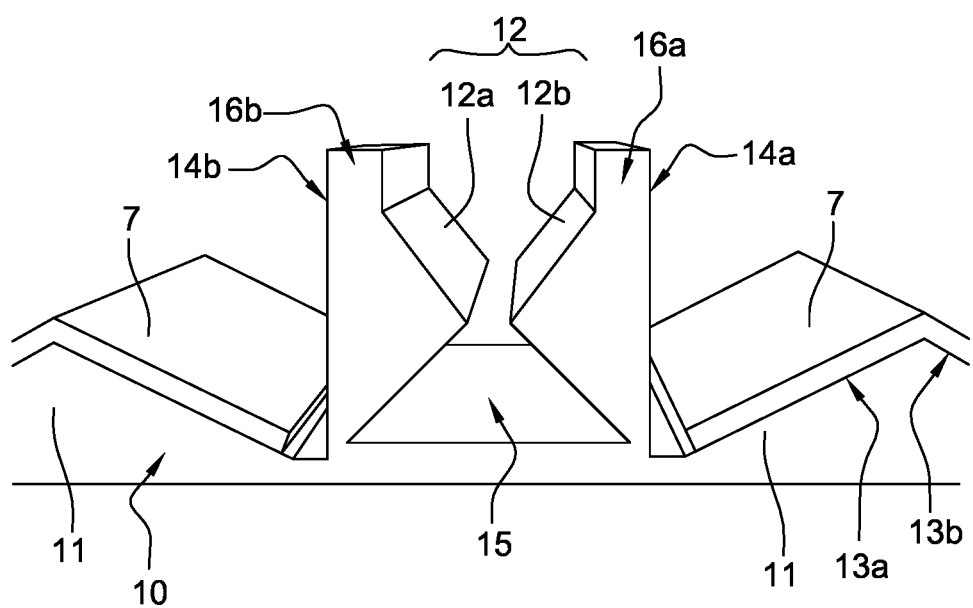
FIG. 7 is a partial perspective view of a green form of tread according to a second embodiment of the method according to the invention.

In the particular example of FIG. 7, it is possible to see that two lateral portions 12, 12a, 12b of two different tread pattern 2 blocks 3 face one another. More specifically, the triangular bases of each prism of the lateral portions 12a, 12b face one another, forming a void 15 with a substantially triangular profile, one of the crowns of the void 15 being formed by the apices of the triangular bases of the facing lateral portions 12a, 12b. In FIG. 7, these apices do not touch one another, but, it being a matter of industrial manufacture, it is possible, as the case may be, for some apices to be able to touch one another.

As illustrated in FIG. 7, the green form 9 of tread 5 can therefore have a plurality of divided tread pattern 2 blocks 3, this not making it impossible for the green form 9 to be in one piece in order to ensure its geometry and to easily mount it on the green form of a tyre 1.

Specifically, the step of forming the green form 9 of tread 5 can be carried out for example by extrusion. It is thus possible to manufacture a profiled element having the desired cross section for all or part of the green form 9 of the tread 5 with the necessary length for the tyre 1 to be manufactured.

The method according to the second embodiment of the invention has a second step intended for mounting at least one reinforcing ply 7 on at least a part 13, 13a, 13b of the central portion 11, with the same effects and advantages as the second step of the first embodiment. The method then has a third step intended for covering the central part 11 with the aid of the first and second lateral portions 12, 12a, 12b. This third step makes it possible to form the tread 5 with at least one tread pattern 2 block 3 that envelops a reinforcing ply 7, with the same effects and advantages as the third step of the first embodiment.

The method according to the second embodiment of the invention may finally have a final rolling step, with the same effects and advantages as the final step of the first embodiment.

Advantageously according to the second embodiment of the invention, the method therefore makes it possible to form a tread 5 made of uncured rubber material, the scrap of which can be recycled. The method can also be implemented separately or directly on a green form, for example on a carcass (not shown), of tyre 1. The tread 5 can thus be reinforced and mounted on the green form of the tyre 1 before the whole is crosslinked.

Advantageously according to the invention, each tread pattern 2 block 3 is created from several portions made of uncured rubber material that may or may not be in one piece. The geometry of the central portion 11 makes it advantageously possible to choose the geometry that the reinforcing ply 7 has with respect to the contact surface of the tread 5. The orientation of the reinforcing ply 7 against the central portion 11 is maintained by covering the first and second lateral portions 12, 12a, 12b. The latter therefore form the part of the tyre 1 that is intended to be in contact with the ground. It will also be understood that the reinforcing ply 7 can thus, advantageously according to the invention, be of very different kinds, for example based on fibres based on polymers or on metal-based thread.

The invention also relates to a method for manufacturing a tyre 1 using the method for manufacturing a tread 5 based on uncured rubber material according to the second embodiment as set out above.

By way of entirely non-limiting example, the method for manufacturing a tyre could have the following steps of:

Manufacturing a carcass based on uncured rubber material;

Mounting on the carcass a tread based on uncured rubber material with the aid of the manufacturing method according to the second embodiment as set out above;

Crosslinking the tyre based on uncured rubber material by hot moulding the latter.

The method for manufacturing the tyre 1 therefore makes it possible to produce a green form 9 of tread 5 with at least one reinforced tread pattern 2 block 3 that can be integrated with conventional tyre 1 manufacturing steps, that is to say without any particular adaptation.

According to a second embodiment, the manufacturing method according to the invention makes it possible to obtain a tyre 1, in which the tread pattern 2 blocks 3 of the tread 5 (parts between the circumferential grooves 6 of the tyre 1) are stiffened, as illustrated in FIG. 8. The stiffening is obtained by a reinforcing ply 7 that is present in each tread pattern 2 block 3 and oriented obliquely with respect to the tread surface so as to limit their deformation in order to improve the behaviour and wearing of the tyre 1.

More specifically, in the example illustrated in FIG. 8, it is possible to see that, in the partial meridian section of the tread 5 (section plane oriented on the axes X-Z) obtained according to the second embodiment of the invention, each reinforcing ply 7 forms a profiled element with a cross section in the form of a chevron in each tread pattern 2 block 3.

Thus, for the block 3c through which the plane PE passes, the reinforcing ply 7 is symmetric with respect to the equatorial plane PE, starts substantially from the bottom of the adjacent groove 6 (a thickness of rubber material is visible in FIG. 8 between the bottom of each groove 6 and each of the ends of the reinforcing ply 7) and extends obliquely in the tread pattern 2 block 3c towards the equatorial plane PE, meeting in the equatorial plane PE without reaching the upper surface of the block 3c. It will be understood that this configuration, advantageously according to the invention, makes it possible to limit the rocking of the tread pattern 2 blocks 3 when the tyre 1 is loaded, while having a wearing thickness exhibiting only rubber material, that is to say in particular without a reinforcing ply 7. It is therefore inferred that the extensions 16a, 16b make it possible to add a thickness of rubber material above the reinforcing plies 7.

The invention is not limited to the embodiments and variants presented and other embodiments and variants will be clearly apparent to a person skilled in the art. In particular, it is possible, as for the first variant of the first embodiment or the second embodiment, to vary the shape of the green form 9 depending on the application, in particular as regards the geometries and dimensions of the central portions 11 and/or of the lateral portions 12, 12a, 12b and/or of the base 10. By way of entirely non-limiting example, the first embodiment and/or the variant of the first embodiment and/or the second embodiment could be combined in one and the same tread 5 and/or in one and the same tread pattern 2 block 3 depending on the application.

Similarly, the same tread 5 could have reinforcing plies 7, 7a, 7b of different materials between two tread pattern 2 blocks 3 or in the same tread pattern 2 block 3 depending on the application.

The invention claimed is:

1. A method for manufacturing a tread based on uncured rubber material comprising:
    forming a green form of tread based on uncured rubber material having at least one tread pattern block, each tread pattern block having a central portion and at least one lateral portion extending along the central portion;
    mounting at least one reinforcing ply on at least a part of the central portion; and
    covering the central portion with the aid of the lateral portion in order that the tread pattern block envelops the at least one reinforcing ply,
    wherein the central portion has a prismatic shape with a triangular base, at least two adjacent faces of the triangular base being intended to receive the reinforcing ply.

2. The method according to claim 1, wherein each central portion and each corresponding lateral portion are connected by a base.

3. The method according to claim 1, wherein each lateral portion has a prismatic shape with a polygonal base, at least one face of the polygonal base being used to cover a part of the central portion.

4. The method according to claim 1, wherein the green form of tread has a plurality of tread pattern blocks.

5. The method according to claim 1, wherein the green form of tread is in one piece.

6. The method according to claim 1, wherein the step of forming the green form of tread is carried out by extrusion.

7. The method according to claim 1, further comprising a final rolling step for improving the adhesion of the lateral portion to a corresponding central portion.

8. A method for manufacturing a tire, the method comprising:
    manufacturing a carcass based on uncured rubber material;
    mounting on the carcass the tread manufactured according to the method according to claim 1; and
    crosslinking the tire.

* * * * *